United States Patent
Lantz et al.

(10) Patent No.: US 9,622,293 B2
(45) Date of Patent: Apr. 11, 2017

(54) MODULAR RADIO TRANSCEIVER

(71) Applicant: Imagination Technologies Limited, Kings Langley (GB)

(72) Inventors: Martin Lantz, Malmö (SE); Pontus Andren, Sollentuna (SE); Joakim Landmark, Uppsala (SE)

(73) Assignee: Imagination Technologies Limited, Kings Langley (GB)

( * ) Notice: Subject to any disclaimer, the term of this patent is extended or adjusted under 35 U.S.C. 154(b) by 18 days.

(21) Appl. No.: 14/497,350

(22) Filed: Sep. 26, 2014

(65) Prior Publication Data

US 2015/0092823 A1    Apr. 2, 2015

(30) Foreign Application Priority Data

Sep. 27, 2013  (SE) ...................................... 1351120
Jun. 17, 2014  (GB) .................................. 1410778.3

(51) Int. Cl.
*H04W 88/10*     (2009.01)
*H04B 7/0413*    (2017.01)

(52) U.S. Cl.
CPC .......... *H04W 88/10* (2013.01); *H04B 7/0413* (2013.01)

(58) Field of Classification Search
CPC ...... H04B 7/0413; H04B 1/406; H04W 88/10
USPC .................. 37/219, 221, 260, 267, 295, 316
See application file for complete search history.

(56) References Cited

U.S. PATENT DOCUMENTS

| | | | |
|---|---|---|---|
| 7,079,869 | B2 | 7/2006 | Aytur et al. |
| 7,184,272 | B1* | 2/2007 | Harlacher .............. H05K 7/023 361/728 |
| 7,499,682 | B2* | 3/2009 | Rozenblit et al. ......... 455/127.3 |
| 8,139,670 | B1 | 3/2012 | Son et al. |
| 8,472,889 | B2* | 6/2013 | Behzad ........................... 455/84 |
| 2007/0071078 | A1* | 3/2007 | Yoshida et al. ................ 375/219 |
| 2011/0159823 | A1 | 6/2011 | Lo et al. |

FOREIGN PATENT DOCUMENTS

| | | |
|---|---|---|
| WO | 02095969 A1 | 11/2002 |
| WO | 2008133489 A1 | 11/2008 |

* cited by examiner

*Primary Examiner* — Freshteh N Aghdam
(74) *Attorney, Agent, or Firm* — Vorys, Sater, Seymour and Pease LLP; Vincent M DeLuca

(57) ABSTRACT

A modular Radio Frequency transceiver includes a frequency synthesizer module arranged to generate a local oscillator signal. At least one transmitter module and/or at least one receiver module are arranged adjacent to the frequency synthesizer module. Each transmitter module and receiver module is arranged to mix at least one respective input signal with the local oscillator signal. Adjacently arranged modules are electrically connected to each other with respect to at least data signals, the local oscillator signal and a power supply.

15 Claims, 3 Drawing Sheets

MODULAR RADIO TRANSCEIVER

TECHNICAL FIELD

The present invention relates to a modular RF (Radio Frequency) transceiver comprising a frequency synthesizer module, at least one transmitter module and at least one receiver module. The frequency synthesizer module is arranged to generate a local oscillator signal.

BACKGROUND

The requirements of higher data rates in wireless communications has led to development of new standards and enhancements of existing standards to support the use of multiple antennas at both the transmitter and receiver to improve communication performance, so called MIMO (Multiple Input Multiple Output) systems. The MIMO technique is used in several radio standards, including; WLAN (Wireless Local Area Network), WCDMA (Wideband Code Division Multiple Access) (3G telecommunications), LTE (Long Term Evolution) (4G telecommunications) and WiMAX (Worldwide Interoperability for Microwave Access). A MIMO radio normally consists of N transmitters and M receivers, where N and M are integers.

Further, a MIMO radio, excluding digital baseband parts, can be implemented either as a standalone Radio Frequency integrated circuit (RFIC) or as part of a system-on-chip (SoC), where the MIMO radio is implemented together with digital baseband parts on the same physical silicon die.

Since MIMO systems exist in a large number of combinations, for example 1×1, 4×4, 2×3 and 2×4, the desire to support a large number of MIMO configurations in a product portfolio is very large, especially if both RFIC and SoC implementations are supported.

There is thus a desire to provide a more versatile radio transceiver than existing radio transceivers, suitably a radio transceiver that is adapted for MIMO.

SUMMARY

The object of the present invention is to provide a more versatile radio transceiver than existing radio transceivers, suitably a radio transceiver that is adapted for MIMO.

This object is obtained by means of a modular RF (Radio Frequency) transceiver comprising a frequency synthesizer module, at least one transmitter module and at least one receiver module. The frequency synthesizer module is arranged to generate a local oscillator signal. All modules are arranged adjacently to each other, sequentially extending one after the other, such that at least one transmitter and/or at least one receiver module is arranged adjacent the frequency synthesizer module. Each transmitter module and receiver module is arranged to mix at least one respective input signal with the local oscillator signal. Adjacently arranged modules are electrically connected to each other with respect to at least data signals, the local oscillator signal and a power supply.

According to an example, at least one transmitter module or at least one receiver module is arranged adjacent another transmitter module or receiver module, where at least one transmitter module and at least one receiver module are arranged sequentially extending from the frequency synthesizer module.

According to another example, each transmitter module and each receiver module comprises a corresponding local oscillator signal buffer. Each local oscillator signal buffer is arranged to receive the local oscillator signal as an input, either from the frequency synthesizer module directly or from another local oscillator signal buffer. Each local oscillator signal buffer is also arranged to amplify said local oscillator signal, each local oscillator signal buffer thus being arranged to output a buffered local oscillator signal.

According to another example, the frequency synthesizer module has a first connection side and a second connection side, where the connection sides are positioned opposite each other. The RF transceiver comprises a plurality of transmitter modules and a plurality of receiver modules which are arranged sequentially extending from the first connection side and the second connection side of the frequency synthesizer module.

According to another example, the RF transceiver is a MIMO (Multiple Input Multiple Output) transceiver.

According to another example, there is provided computer readable code for generating the described transceiver. A computer readable storage medium may have encoded thereon computer readable code for generating the transceiver.

A number of advantages are obtained by means of the present invention.

Current art describes an N×N single-chip dual-band RF transceiver, for example a MIMO transceiver, including N substantially identical transceiver blocks and a common local oscillator. The grouping of a transmitter and a receiver into a transceiver block unnecessarily limits the number of possible configurations, which limit is alleviated by means of the present invention.

A transceiver according to the present invention is made up from N substantially identical transmitter modules, or slices, M substantially identical receiver modules, and a common local oscillator module. This approach allows configurations where the number of transmitters does not have to be equal to the number of receivers.

Furthermore, the modular design according to the present invention provides self-contained modules which interface with each other, including local oscillator signal, digital control signals and power supply. Such a module is connected simply by physically placing it abutted next to the other modules and making mating corresponding connector connections to connect.

Another advantage is short development time to implement new products.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
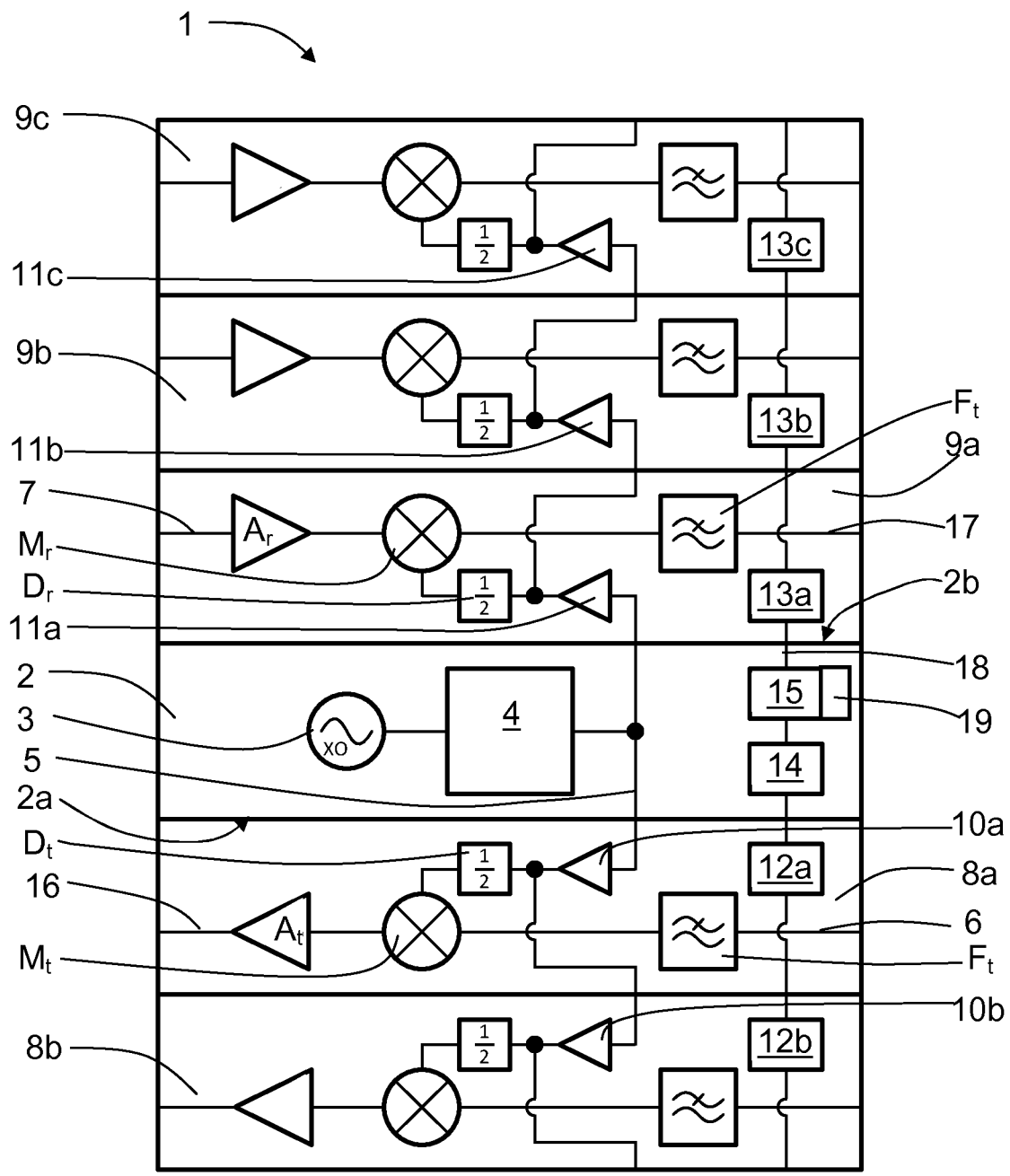
FIG. 1 is a simplified schematic block diagram of a 2×3 High-Band MIMO RF transceiver using a configurable MIMO radio structure according to one aspect of the invention.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element.

Common reference numerals are used throughout the figures, where appropriate, to indicate similar features.

DETAILED DESCRIPTION

With reference to FIG. 1, showing a first example, there is a MIMO RF transceiver 1. The transceiver 1 includes a frequency synthesizer 2 comprising a local oscillator 3 and a phase-locked loop circuit 4. In the frequency synthesizer 2, a local oscillator signal 5 is generated, which local oscillator signal 5 is used to modulate baseband signals 6 that are to be transmitted by the transceiver 1, and to demodulate RF signals 7 received by the transceiver 1, as will be described more in detail below. The frequency synthesizer 2 is generally constituted by a frequency synthesizer module 2.

The transceiver 1 further includes a plurality of transmitter modules 8a, 8b and receiver modules 9a, 9b, 9c. Each transmitter module 8a, 8b is adapted to independently transmit wireless signals, and each receiver module 9a, 9b, 9c is adapted to independently receive wireless signals. All transmissions and receptions take place by means of suitable antennas (not shown).

According to one aspect of the present invention, the transmitter modules 8a, 8b and receiver modules 9a, 9b, 9c are physically arranged in a line or row adjacent to each other and the frequency synthesizer 2. A first transmitter module 8a and a first receiver module 9a are both positioned immediately adjacent to the frequency synthesizer 2, on opposite sides of the frequency synthesizer 2, and both receive the local oscillator signal 5 directly from the frequency synthesizer 2. The first transmitter module 8a and the first receiver module 9a uses the local oscillator signal 5 to modulate and demodulate transmitted and received signals, respectively. Adjacently arranged modules are electrically connected to each other with respect to at least data signals, the local oscillator signal and a power supply (not shown).

The transceiver 1 and all modules in all examples of the present invention are arranged on one and the same silicon die, each transceiver 1 thus being manufactured by means of one total layout adapted for a suitable silicon die in a previously well-known manner. It should also be pointed out that each silicon die comprising one transceiver 1 according to the present invention also may comprise additional circuitry. For example, there may be a baseband part on the die, outside the modules, where baseband processing is performed.

In the following, the first transmitter module 8a and the first receiver module 9a will be described more in detail, but it will be understood that all the corresponding modules 8a, 8b; 9a, 9b, 9c are of similar design.

The first transmitter module 8a comprises a signal output transmitter amplifier arrangement $A_t$, a transmitter mixer $M_t$, a transmitter frequency divider $D_t$ and an input transmitter filter $F_t$. An input baseband signal 6 is first filtered in the input transmitter filter $F_t$ and then mixed with the local oscillator signal 5 in the transmitter mixer $M_t$, which local oscillator signal 5 first has been divided to its half frequency by the transmitter frequency divider $D_t$. The mixed signal, now constituting an RF signal, is then amplified by the signal output transmitter amplifier arrangement $A_t$, then constituting a transmitter output RF signal 16. Each transmitter module 8a, 8b, comprises corresponding components.

The first receiver module 9a comprises a signal input receiver amplifier arrangement $A_r$, a receiver mixer $M_r$, a receiver frequency divider $D_r$ and an output receiver filter $F_r$. An input RF signal 7 is first amplified by the signal input receiver amplifier arrangement $A_r$ and then mixed with the local oscillator signal 5 in the receiver mixer $M_r$, which local oscillator signal 5 first has been divided to its half frequency by the receiver frequency divider $D_r$. The mixed signal, now constituting a baseband signal, is then filtered by the output receiver filter $F_r$, then constituting a receiver output signal 17. Each receiver module 9a, 9b, 9c comprises corresponding components.

Furthermore, the first transmitter module 8a comprises a first transmitter local-oscillator-signal buffer 10a and the first receiver module 9a comprises a first receiver local-oscillator-signal buffer 11a, each first local-oscillator-signal buffer 10a, 11a being arranged to receive and amplify the local oscillator signal 5. This is necessary, since the local oscillator signal 5 is of a relatively high frequency, typically about 10 GHz, and is attenuated quickly over short distances. To maintain the local oscillator signal 5 at a sufficient signal level, it generally needs buffering. The first transmitter local-oscillator-signal buffer 10a is further arranged to provide the amplified local oscillator signal to the next adjacent transmitter module, here the second transmitter module 8b, where it is amplified in a second transmitter local-oscillator-signal buffer 10b comprised in the second transmitter module 8b.

Correspondingly, the first receiver local-oscillator-signal buffer 11a is further arranged to provide the amplified local oscillator signal to the next adjacent receiver module, here the second receiver module 9b, where it is amplified in a second receiver local-oscillator-signal buffer 11b comprised in the second receiver module 9b. In the same manner, the local oscillator signal 5 is distributed from the second receiver module 9b to the next adjacent receiver module, here the third receiver module 9c, where it is amplified in a third receiver local-oscillator-signal buffer 11c comprised in the third receiver module 9c.

In this example, there are two transmitter modules 8a, 8b and three receiver modules 9a, 9b, 9c, but it should be understood that the number of transmitter modules and receiver modules does not make any difference for the distribution of the local oscillator signal 5. The local oscillator signal 5 is thus distributed from one module to the next adjacent module and so on for both receiver modules and transmitter modules, via corresponding local-oscillator-signal buffers, each transmitter module and receiver module comprising a corresponding local-oscillator-signal buffer.

In other words, this process is repeated until the local oscillator signal has been distributed to each transmitter module and receiver module in the MIMO transceiver 1, irrespective of the number and order of the adjacently arranged modules.

The first transmitter module 8a comprises a first transmitter control unit 12a and the second transmitter module 8b comprises a second transmitter control unit 12b. The first receiver module 9a comprises a first receiver control unit 13a, the second receiver module 9b comprises a second receiver control unit 13b and the third receiver module 9c comprises a third receiver control unit 13c. The frequency synthesizer 2 comprises a synthesizer control unit 14 and a master control unit 15.

All control units 12a, 12b; 13a, 13b, 13c; 14 are arranged to communicate with each other and the master control unit 15 by means of a daisy chained data bus 18 which is controlled by the master control unit 15, which master control unit 15 also includes an external interface 19, which may be a series-to-parallel interface (SPI). The master control unit 15 may, as in this example, be physically placed within the synthesizer module 2, or alternatively within any module that preferably is centrally located.

The use of a daisy chained data bus 18 is only an example; any type of suitable data bus may be used for data communication according to the above.

Figure 2:
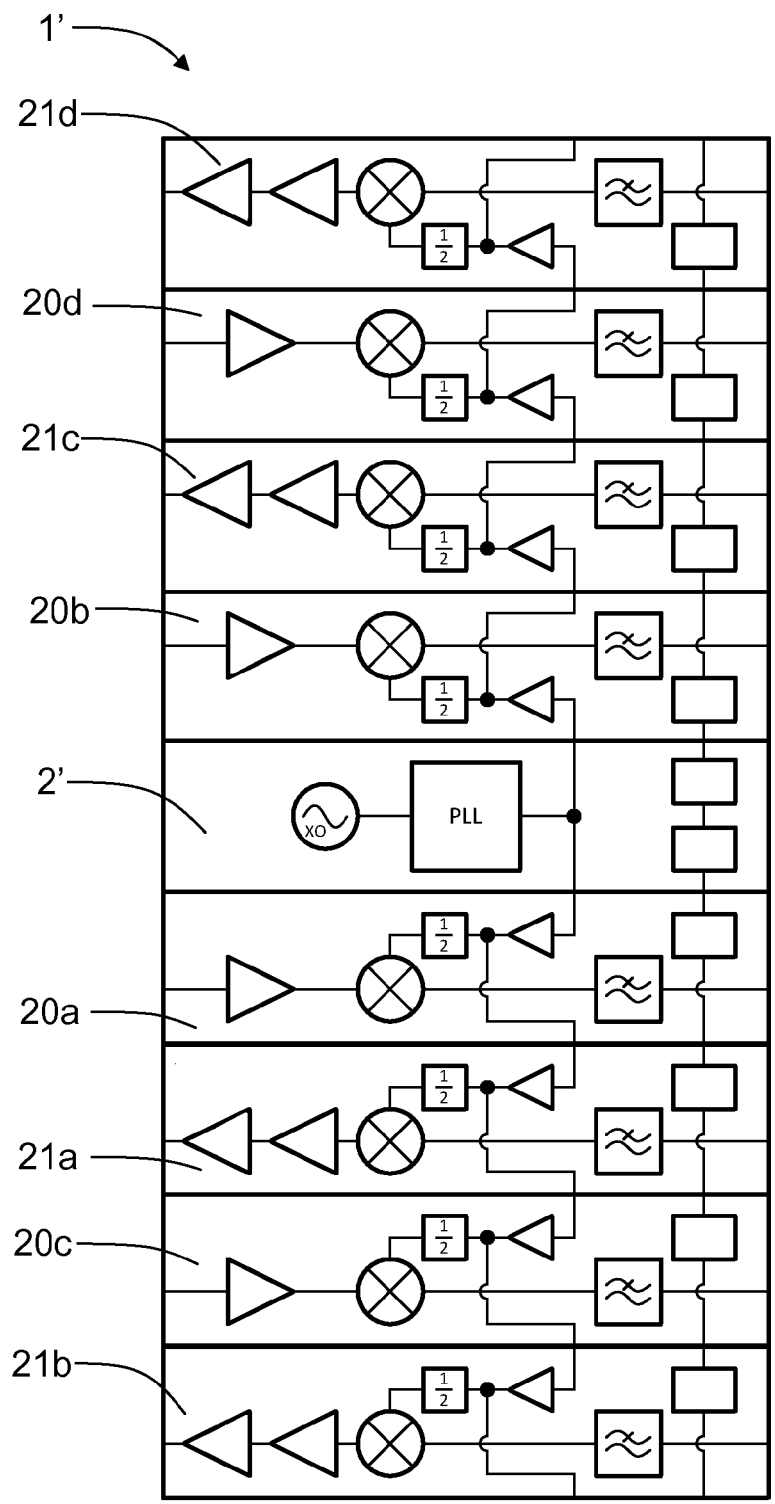
FIG. 2 is a simplified schematic block diagram of a 4×4 MIMO High-Band MIMO RF transceiver using a configurable MIMO radio structure according to another aspect of the invention.

FIG. 2 shows a second example of the present invention where the modular transceiver is constituted by a 4×4 MIMO High-Band MIMO RF transceiver 1' of similar modular design as in the first example. The transceiver 1' comprises a centrally placed frequency synthesizer 2' abutting a first receiver module 20a on one side and a second receiver module 20b on the opposite side.

The first receiver module 20a is adjacent to a first transmitter module 21a, which in turn is adjacent to a third receiver module 20c, which in turn is adjacent to a second transmitter module 21b. Correspondingly, the second receiver module 20b is adjacent to a third transmitter module 21c, which in turn is adjacent to a fourth receiver module 20d, which in turn is adjacent to a fourth transmitter module 21d.

The frequency synthesizer 2' and the modules 20a, 20b, 20c, 20d; 21a, 21b, 21c, 21d are of similar design as in the first example, and their details are not further discussed here. The second example is an illustration of the versatility conferred by the present invention, allowing modules to be positioned in any number and order on a silicon die that is convenient for the present purpose.

By means of the present invention, multi-band operation is provided. This is achieved by using different versions of the transmitter modules and the receiver modules. Each version is tailored to accommodate one or several unique frequency bands. Combining different versions of the transmitter modules and receiver modules in this way allows multi-band implementations.

As an example, in this way, a modular N×M MIMO RF transceiver 1 includes support for two frequency bands, a low band with a center frequency of around 2.4 GHz and a high band with a center frequency of around 5 GHz, at which frequency bands 802.11 WLAN (Wireless Local Area Network) currently is deployed. The exact frequency may of course vary, e.g. due to country and specific needs, as it already in fact does today wherein it is known that WiFi may use 2.400-2.500 GHz spectrum, and 4.915-5.825 GHz band, but commonly referred to as the "2.4 GHz and 5 GHz bands".

Generally, at least one transmitter module is arranged to transmit signals at a first frequency band $f_1$, and at least one receiver module is arranged to receive signals at the first frequency band $f_1$. In the same manner, at least one other transmitter module is arranged to transmit signals at a second frequency band $f_2$, and at least one other receiver module is arranged to receive signals at the second frequency band $f_2$. The same local oscillator signal 5 is arranged for mixing with signals at the first frequency band $f_1$ and the second frequency band $f_2$ in order to create a transmitter output RF signal 16 and a receiver output signal 17.

The invention relates to a modular MIMO transmitter and receiver, arranged for dual-band functionality. Dividing the functional components of the transceiver into self-contained modules, or slices, can dramatically speed up the implementation phase. The transmitter modules, receiver modules and synthesizer module contain all necessary interfaces, references and control circuits. This enables eliminating the need for additional circuits in the modules. All functionality and circuits are then contained within the modules, which are self-contained. By just physically arranging the modules next to one another on a die connects all interfaces, including the power supply network. One notable advantage of his approach is that it allows very short development time to implement new products.

The slice-like shape allows many modules to be stacked and still producing silicon die dimensions which are easily manufactured and easily packaged.

Moreover, the digital control units are organized in a way allowing configurations with different number of modules to be fully functional simply by physically arranging the modules abutted next to another. This is achieved by physically distributing the control units among the modules as described above. The control units communicate by means of data buses, for example daisy chained data buses, being controlled by the master control unit 15, which also provides the external interface 19.

Using separate transmit, receive and synthesizer modules allows a great degree of freedom in physical placement, which for instance can be exploited to minimize crosstalk and interference between the modules. This is of particular concern when it comes to implementing radio standards using frequency division multiplexing like WCDMA (Wideband Code Division Multiple Access). Another benefit is that the transmitter modules and receiver modules easily can be arranged in accordance to the signal order of external devices like front-end modules, thus avoiding crossing of the sensitive RF signal lines on the printed circuit board.

Figure 3:
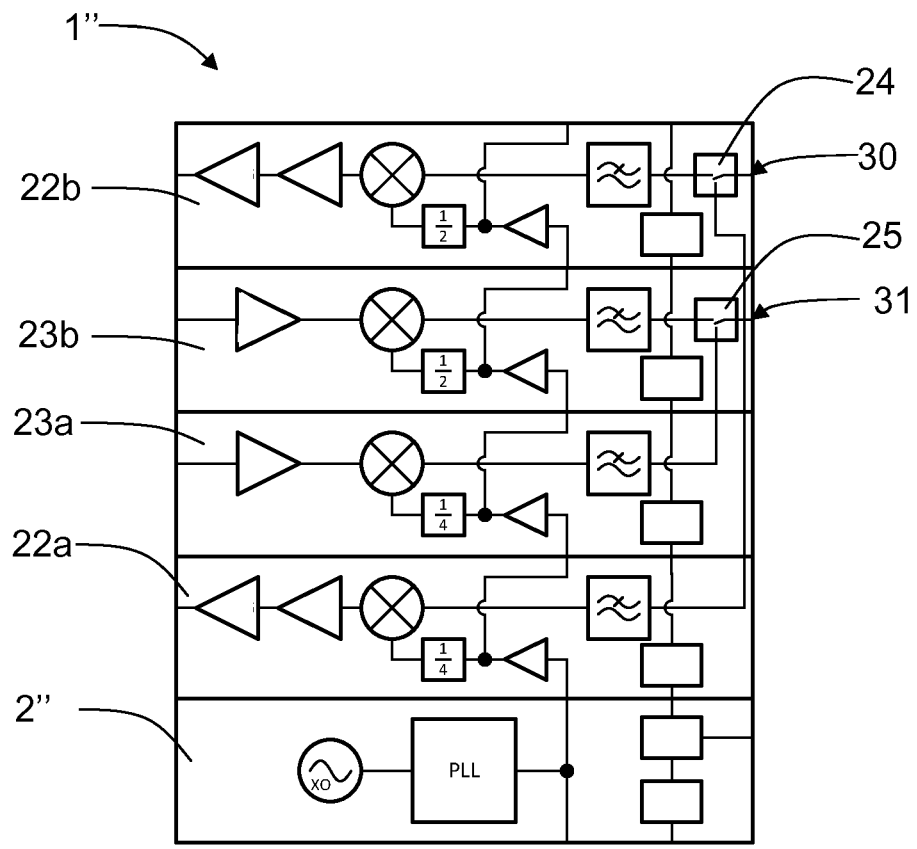
FIG. 3 is a simplified schematic block diagram of a 1×1 MIMO Dual-Band MIMO RF transceiver with multiplexers in accordance with yet another aspect of the invention.

FIG. 3 shows a third example of the present invention where the modular transceiver is constituted by a 1×1 MIMO Dual-Band MIMO RF transceiver 1" of similar modular design as in the other examples. The transceiver 1" comprises a centrally placed frequency synthesizer 2" abutting a first transmitter module 22a on one side. The first transmitter module 22a is adjacent to a first receiver module 23a, which in turn is adjacent to a second receiver module 23b, which in turn is adjacent to a second transmitter module 22b.

The frequency synthesizer 2" and the modules 22a, 22b; 23a, 23b are of similar design as in the first example, and their details are not further discussed here.

The second transmitter module 22b comprises a first multiplexer 24 that is arranged to switch between either:
- connecting a baseband signal input 30 to the first transmitter module 22a, where the first transmitter module 22a is arranged to transmit signals at a first frequency band $f_1$; or
- connecting the baseband signal input 30 to the second transmitter module 22b, where the second transmitter module 22b is arranged to transmit signals at a second frequency band $f_2$.

The second receiver module 23b comprises a second multiplexer 25 that is arranged to switch between either:
- connecting a receiver signal output 31 to the first receiver module 23a, that is arranged to receive signals at the first frequency band $f_1$; or connecting the receiver signal output 31 to the second receiver module 23b, that is arranged to receive signals at the second frequency band $f_2$.

The multiplexers 24, 25 alternatively may be placed outside the modules, but preferably on the same die. If more frequency bands are used, more multiplexers may be used as well. Each multiplexer also may be used to switch between several receiver modules or transmitter modules. The multiplexers 24, 25 enable fewer baseband signal leads to pass between the modules and a baseband part of the die, where baseband processing is performed.

The first frequency band $f_1$ may be at a higher frequency than the second frequency band $f_2$, for example they may correspond to the previously discussed high band with a center frequency of around 5 GHz and the low band with a center frequency of around 2.4 GHz.

Figure 4:
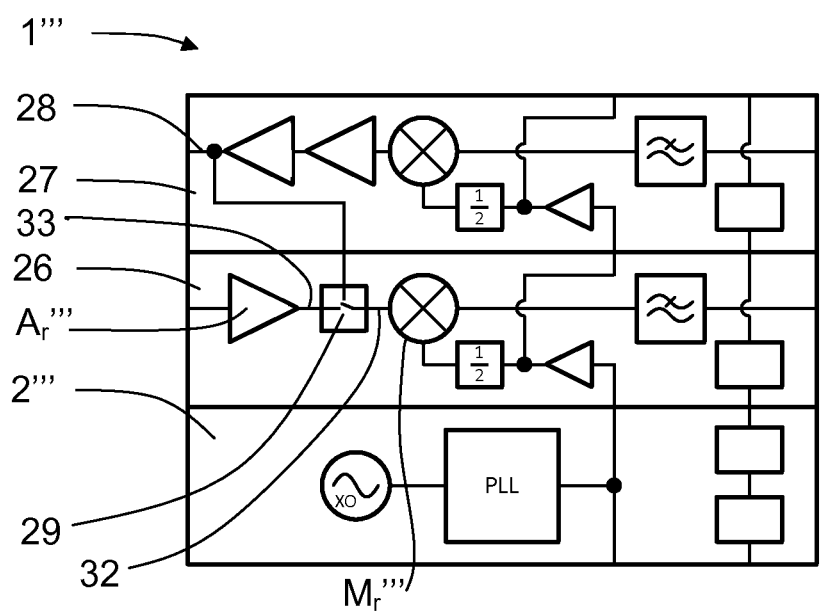
FIG. 4 is a simplified schematic block diagram of a 1×1 MIMO High-Band MIMO RF transceiver where one receiver module comprises loopback functionality by means of a multiplexer in accordance with a still further aspect of the invention.

FIG. 4 shows a fourth example of the present invention where the modular transceiver is constituted by a 2×2 MIMO High-Band MIMO RF transceiver 1''' of similar modular design as in the other examples. The transceiver 1''' comprises a centrally placed frequency synthesizer 2''' abutting a receiver module 26 on one side, which in turn is adjacent a transmitter module 27, outputting a transmitter output signal 28.

As in the first example, the receiver module 26 comprises a receiver amplifier arrangement $A_r'''$ and a receiver mixer $M_r'''$. The frequency synthesizer 2''' and the modules 26, 27 are of similar design as in the first example, and their details are not further discussed here.

Here, the receiver module 26 includes a multiplexer 29 that is connected to a signal input 32 of the receiver mixer $M_r'''$, and is arranged to switch the signal input 32 of the receiver mixer $M_r'''$ to either a receiver input signal 33 that has been amplified by the receiver amplifier arrangement $A_r'''$, or to the transmitter output signal 28. When the multiplexer 29 connects the signal input 32 of the receiver mixer $M_r'''$ to the transmitter output signal 28, the receiver amplifier arrangement $A_r'''$ is suitably turned off.

By means of this arrangement, a so-called loopback functionality is obtained, enabling internal transmitter signals and internal receiver signals to be mutually connected. This enables measuring the transmitter output signal 28, which in turn enables calibrating undesired signal properties inflicted by the transmitter module.

The loopback functionality may be implemented for one or several transmitter modules, and the transmitter output signals may be switched to one or several receiver modules.

The multiplexers 24, 25, 29 in the examples above may be constituted by any suitable switching devices.

The present invention is not limited to the above, but may vary freely within the scope of the appended claims. For example, the transceiver of the present invention does not have to be a MIMO transceiver, but can be used in any radio standard. When the transceiver of the present invention is a MIMO transceiver, examples of suitable standards using MIMO technology may be; WCDMA, LTE (Long Term Evolution) and WiFi. The modular approach has also been used for radio standards that do not use MIMO, such as Bluetooth.

Further it is foreseen that the invention may encompass a module having both high band and low band amplifiers A and mixers M, but merely one common filter F, which may provide a better form factor, e.g. for the design of 4×4 dual band, which otherwise may require 17 modules. When using the above combination, the modules will be substantially longer, about 50% longer, but the same width, but will merely require about 50% as many modules, i.e. 9 instead of 17.

Each signal output transmitter amplifier arrangement $A_t$ may comprise one or more individual amplifiers, where one or more individual amplifier in each signal output transmitter amplifier arrangement $A_t$ may be constituted by a power amplifier, each power amplifier being in the form of an on-chip power amplifier. This is illustrated in FIG. 2. FIG. 3 and FIG. 4, where there are two amplifiers in each transmitter module. If an external power amplifier module is used, a version of the transmitter modules with a power amplifier driver is used. These versions may also be mixed within the MIMO transceiver 1.

Correspondingly, each signal input receiver amplifier arrangement $A_r$ may for example comprise one or more individual amplifiers, where one or more of said individual amplifiers may be constituted by a low-noise amplifier.

The present invention provides a modular RF transceiver that comprises a frequency synthesizer module, at least one transmitter module and at least one receiver module. All modules are arranged adjacently to each other, sequentially extending one after the other, such that at least one transmitter module and/or at least one receiver module is arranged adjacent the frequency synthesizer module. As shown in FIG. 1, The frequency synthesizer module 2 has a first connection side 2a and a second connection side 2b, the connection sides 2a, 2b being positioned opposite each other. The transmitter modules 8a, 8b are arranged sequentially extending from the first connection side 2a, and the receiver modules 9a, 9b, 9c are arranged sequentially extending from the second connection side 2b.

The digital communication may be accomplished in many ways and is not limited to the example described. For example, the control units 12a, 12b; 13a, 13b, 13c; 14 may be sequentially connected by address and data parallel buses which are arranged to be accessed directly by a device that is external with respect to the transceiver. Said device may in other words be arranged on the same silicon die as the transceiver 1.

A die on which the transceiver 1 according to the present invention is arranged may be made in any suitable material and is not limited to silicon dies. For example, dies may be made from mono-crystal silicon wafers, silicon on sapphire or gallium arsenide wafers.

The local-oscillator-signal buffers 10a, 10b; 11a, 11b, 11c do not have to be present, at least not at all modules. When only a few modules are used and the signal paths are kept electrically short, the attenuation of the local oscillator signal is not of such a magnitude that buffers may be needed, at least not at all modules.

The local-oscillator-signal buffers 10a, 10b; 11a, 11b, 11c may be constituted by any type of suitable amplifier.

The specific components of a synthesizer module, a transmitter module and a receiver module and how they are connected may of course vary; the specific circuit solutions provided are only examples. Many different types of synthesizer modules, transmitter modules and receiver modules are conceivable for the skilled person. For example, the local oscillator signal may be chosen such that no frequency dividers $D_t$, $D_r$ are needed.

Those skilled in the art will realize that all, or a portion of the functionality, techniques or methods may be carried out by a dedicated circuit, an application-specific integrated circuit, a programmable logic array, a field-programmable gate array, or the like. For example, the modules may comprise hardware in the form of circuitry. Such circuitry may include transistors and/or other hardware elements available in a manufacturing process. Such transistors and/or other elements may be used to form circuitry, analogue or digital components or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The modules may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements the modules described above, such as HDL (hardware description language) software, as is used for designing integrated circuits, or for configuring programmable chips, to carry out desired functions. That is, there may be provided a computer readable storage medium having encoded thereon computer readable program code for generating a transceiver configured to perform any of the methods described herein, or for generating a transceiver comprising any apparatus described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

The invention claimed is:

1. A modular radio frequency (RF) transceiver comprising:
   a frequency synthesizer module;
   at least one transmitter module; and
   at least one receiver module,
   wherein the frequency synthesizer module is arranged to generate a local oscillator signal, and
   wherein each of said modules is arranged adjacently to another of said modules, such that at least one of said at least one transmitter module and said at least one receiver module is arranged adjacent to the frequency synthesizer module, each of said at least one transmitter module and said at least one receiver module being arranged to mix at least one respective input signal with the local oscillator signal, said adjacently arranged modules being electrically connected to each other such that each of said transmitter and receiver modules receives at least data signals, the local oscillator signal and a power supply from an adjacent one of said transmitter, receiver, and frequency synthesizer modules.

2. The modular RF transceiver according to claim 1, wherein at least one of said at least one transmitter module or at least one of said at least one receiver module is arranged adjacent to another transmitter module or receiver module, where said at least one of said at least one transmitter module and said at least one of said at least one receiver module are arranged sequentially extending from the frequency synthesizer module.

3. The modular RF transceiver according to claim 1, wherein each of said at least one transmitter module and each of said at least one receiver module comprises a corresponding local oscillator signal buffer, each local oscillator signal buffer being arranged to receive the local oscillator signal as an input, either from the frequency synthesizer module directly or from another local oscillator signal buffer, each local oscillator signal buffer also being arranged to amplify said local oscillator signal, each local oscillator signal buffer thus being arranged to output a buffered local oscillator signal.

4. The modular RF transceiver according to claim 1, wherein the frequency synthesizer module has a first connection side and a second connection side, the connection sides being positioned opposite each other, where the RF transceiver comprises a plurality of transmitter modules and a plurality of receiver modules which are arranged sequentially extending from the first connection side and the second connection side of the frequency synthesizer module.

5. The modular RF transceiver according to claim 1, wherein the RF transceiver is a MIMO (Multiple Input Multiple Output) transceiver.

6. The modular RF transceiver according to claim 1, wherein each of said at least one transmitter module, each of said at least one receiver module and the frequency synthesizer module comprises a corresponding transmitter control unit, receiver control unit and frequency synthesizer control unit, each of said control units being arranged to control the mode of operation of its respective module, where at least one module further comprises a master control unit, all control units being arranged sequentially along the modules and being connected by a data bus, said master control unit being arranged to control the data bus and to provide an external interface.

7. The modular RF transceiver according to claim 6, wherein said control units are sequentially connected by an address and data parallel bus which is arranged to be accessed directly by a device that is external with respect to the transceiver.

8. The modular RF transceiver according to claim 6, wherein the master control unit comprises a serial-to-parallel interface, enabling access via a serial interface.

9. The modular RF transceiver according to claim 1, wherein:
   at least one of said at least one transmitter module is arranged to transmit signals at a first frequency band, and at least one of said at least one receiver module is arranged to receive signals at the first frequency band; and
   at least one other of said at least one transmitter module is arranged to transmit signals at a second frequency band, and at least one other of said at least one receiver module is arranged to receive signals at the second frequency band;
   where the same local oscillator signal is arranged for mixing signals at the first frequency band and the second frequency band.

10. The modular RF transceiver according to claim 9, wherein the first frequency band comprises a 5 GHz band and that the second frequency band comprises a 2.4 GHz band.

11. The modular RF transceiver according to claim 1, wherein the modular RF transceiver comprises at least one switching device that is arranged to switch between either:
   connecting a baseband signal input to at least a first of said at least one transmitter module, where said first of said at least one transmitter module is arranged to transmit signals at a first frequency band; or
   connecting the baseband signal input to at least a second of said at least one transmitter module, where said second of said at least one transmitter module is arranged to transmit signals at a second frequency band.

12. The modular RF transceiver according to claim 1, wherein the modular RF transceiver comprises at least one switching device that is arranged to switch between either:
   connecting at least a first of said at least one receiver module, that is arranged to receive signals at a first frequency band, to a receiver signal output; or
   connecting at least a second of said at least one receiver module, that is arranged to receive signals at a second frequency band, to the receiver signal output.

13. The modular RF transceiver according to claim 1, wherein at least one transmitter module comprises at least one power amplifier.

14. The modular RF transceiver of according to claim 1, wherein at least one receiver module comprises a switching device that is connected to a signal input of a receiver mixer in said at least one receiver module, the switching device being arranged to switch the signal input to either a receiver input signal or a transmitter output signal being outputted from at least one of said at least one transmitter module, such that at least one of said at least one transmitter module and at least one of said at least one receiver module comprises a loopback functionality.

15. A non-transitory computer readable medium having encoded thereon computer readable code for generating a modular RF transceiver comprising
   integrated circuits, or for configuring programmable chips, said computer readable code including processor-executable instructions that cause a processor to define the configuration of hardware that implements said modular RF transceiver, wherein said configuration comprises: a frequency synthesizer module, at least one transmitter module and at least one receiver module,
   wherein the frequency synthesizer module is arranged to generate a local oscillator signal, and
   wherein each of said modules is arranged adjacently to another of said modules, such that at least one of said at least one transmitter module and said at least one receiver module is arranged adjacent to the frequency synthesizer module, each of said at least one transmitter module and said at least one receiver module being arranged to mix at least one respective input signal with the local oscillator signal, said adjacently arranged modules being electrically connected to each other such that each of said transmitter and receiver modules receives at least data signals, the local oscillator signal and a power supply from an adjacent one of said transmitter, receiver, and frequency synthesizer modules.

\* \* \* \* \*